United States Patent [19]

Melton

[11] Patent Number: 5,261,181

[45] Date of Patent: Nov. 16, 1993

[54] JET HEAD FISHING LURE

[76] Inventor: Tracy Melton, 2922 Edgeley Pl., Los Alamitos, Calif. 90720

[21] Appl. No.: 831,042

[22] Filed: Feb. 4, 1992

[51] Int. Cl.$^5$ .............................................. A01K 85/00
[52] U.S. Cl. ................................. 43/42.06; 43/42.36
[58] Field of Search ................ 43/42.06, 42.11, 42.31, 43/42.35, 44.99, 42.36, 42.05

[56] References Cited

U.S. PATENT DOCUMENTS

| | | | |
|---|---|---|---|
| 3,507,070 | 4/1970 | Rossello | 43/42.06 |
| 3,521,394 | 7/1970 | Wintersberger | 43/42.06 |
| 4,069,609 | 1/1978 | Demy | 43/42.06 |
| 4,098,017 | 7/1978 | Hall | 43/42.06 |
| 4,102,075 | 7/1978 | Wagner et al. | 43/42.06 |
| 4,438,583 | 3/1984 | Sullivan | 43/42.06 |
| 4,881,340 | 11/1989 | Davis | 43/42.06 |

*Primary Examiner*—Mark Rosenbaum
*Assistant Examiner*—Chuck Y. Mah
*Attorney, Agent, or Firm*—Lynn & Lynn

[57] ABSTRACT

A housing has a base, a central section connected to the base, and a front section connected to the central section. The base includes a first bore having a first diameter, and the central section has a second bore having a second diameter in fluid communication with the first bore. The front section encloses a cavity and further includes a plurality of water intake passages to conduct water into the cavity such that when the housing is towed through water, the water intake passages, the cavity in the front section, the bore in the central section and the bore in the base cooperate to eject a stream of water from the base. The diameter of the bore in the central section is preferably larger than the diameter of the bore in the base to create a nozzle effect when water is taken in through the water intake passages and expelled from the base.

10 Claims, 2 Drawing Sheets

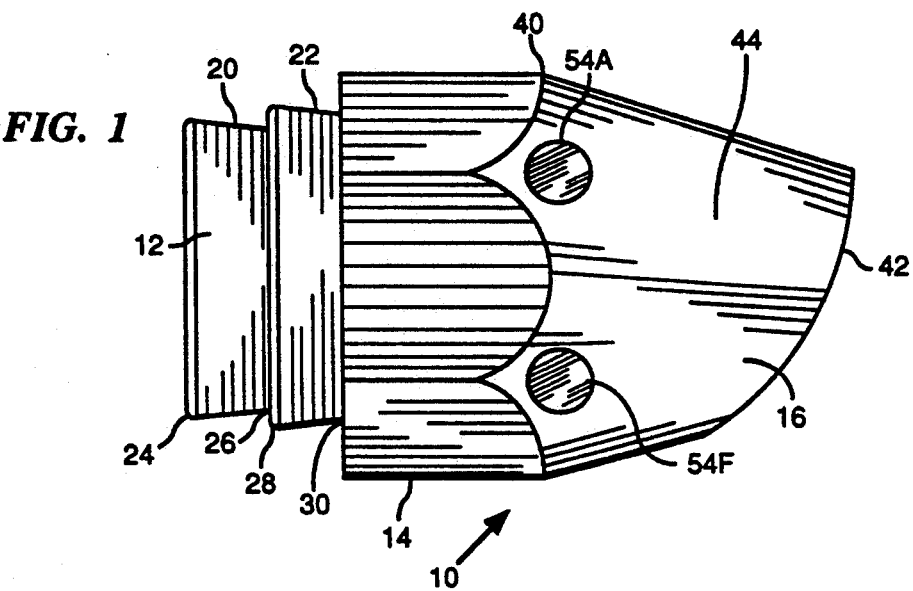
FIG. 1
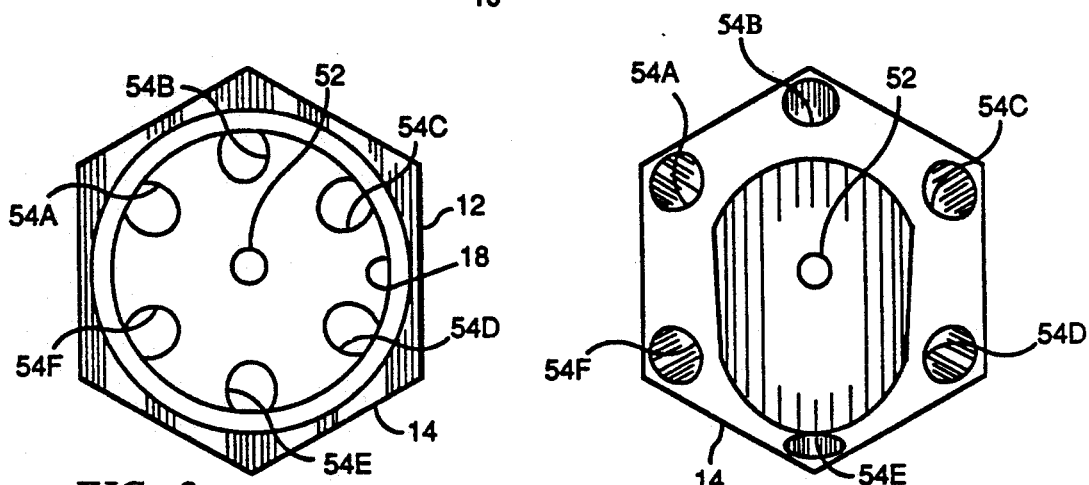
FIG. 3
FIG. 2
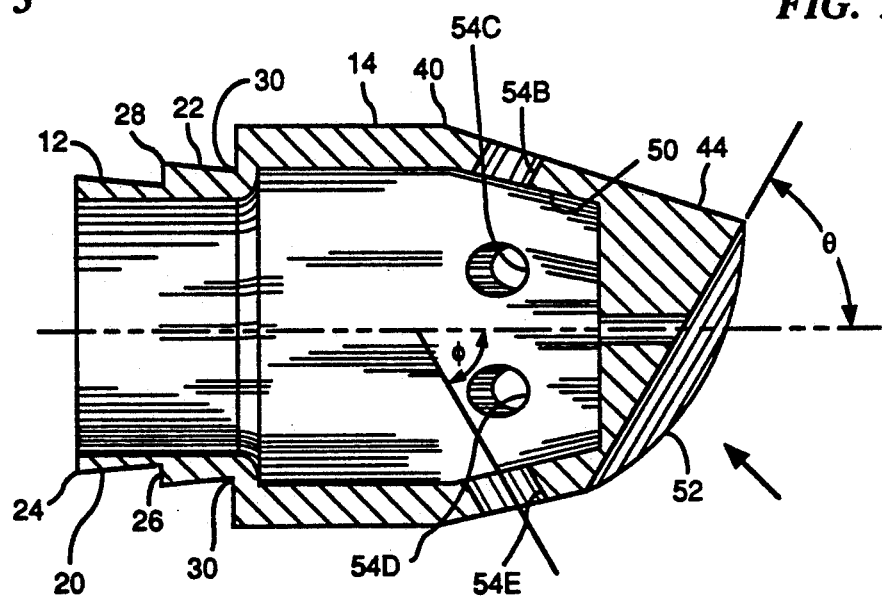
FIG. 4

JET HEAD FISHING LURE

BACKGROUND OF THE INVENTION

This invention relates generally to fishing lures and particularly to fishing lures that force water through holes to make bubbles for attracting a fish.

SUMMARY OF THE INVENTION

The present invention provides a head for a jet head fishing lure that is more efficient in attracting fish than are previous fishing lure devices. The het head according to the invention wiggles in the water and expels bubbles that attract a fish, which takes the lure into its mouth and is then caught on one or more hooks.

The jet head fishing lure according to the present invention comprises a housing having a base, a central section connected to the base and a front section connected to the central section. The base includes a first bore having a first diameter. The central section includes a second bore having a second diameter in fluid communication with the first bore.

The front has an outer configuration that is generally frustoconical with a curved side surface and front end surface. The front section encloses a generally frustoconical cavity and further includes a plurality of water intake passages through the curved side surface to conduct water into the frustoconical cavity such that when the housing is towed through water, the water intake passages, the cavity in the front section, the bore in the central section and the bore in the base cooperate to eject a stream of water from the base.

The front end surface may be formed to have a generally concave configuration or it may be generally planar. The front end surface has a longitudinal center line that may make an acute angle with the longitudinal axis of the housing. The longitudinal center line of the front end surface may coincident with the longitudinal axis of the housing.

The diameter of the bore in the central section is preferably larger than the diameter of the bore in the base to create a nozzle effect when water is taken in through the water intake passages and expelled from the base.

An appreciation of other aims and objectives of the present invention and a more complete understanding of this invention may be had by studying the following description of the preferred embodiment and by referring to the accompanying drawings.

BRIEF DESCRIPTION OF THE DRAWINGS

FIG. 1 illustrates a jet head fishing lure according to the present invention;

FIG. 2 is a front end elevation view of the jet head fishing lure of FIG. 1;

FIG. 3 is a rear end elevation view of the jet head fishing lure of FIG. 1;

FIG. 4 is a cross-sectional view showing a stepped central bore in the jet head fishing lure of FIG. 1;

DESCRIPTION OF THE PREFERRED EMBODIMENT

Figure 5:
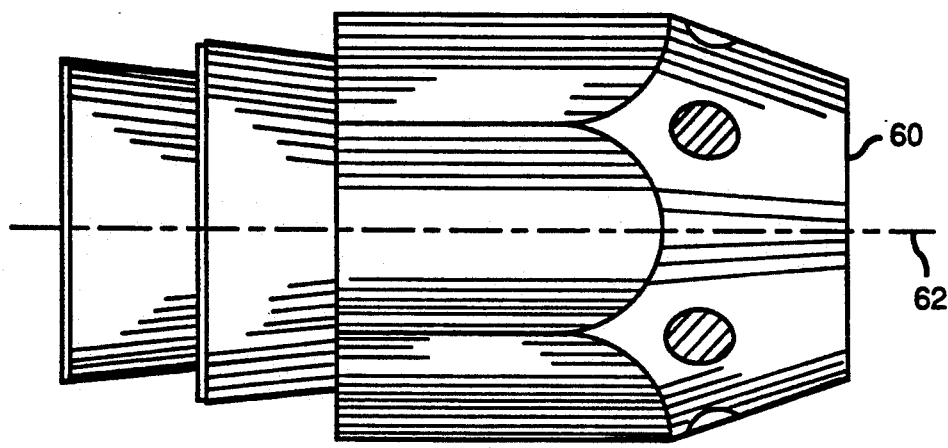
FIG. 5 illustrates a second embodiment of the jet head fishing lure according to the present invention.

Referring to FIG. 1, a jet head fishing lure 10 according to the present invention may be formed to have a base 12, a central portion 14 and a front section 16.

The base 12 is formed to have a skirt (not shown) mounted thereon in a manner well-known for fishing lures. Referring to FIGS. 3 and 4, the inside of the base 12 may include a smooth cylindrical bore 18. The outer part of the base may include a pair of tapered sections 20 and 22 arranged so that the wider end 24 of the tapered section 20 forms a rear opening in the jet head fishing lure 10 and the narrower end 26 of the tapered section 20 is connected to the wider end 28 of the tapered section 22. The narrower end 30 of the tapered section 22 is connected to the central portion 14 of the jet head fishing lure 10. The tapered sections 20 and 22 are illustrated as being a pair of substantially identical frustocones mounted end-to-end.

The central portion 14 may be formed in any convenient configuration. In FIGS. 1-3 the central portion 14 is shown to be hexagonal in cross section. The central portion 14 may have other cross sections, for example, any other polygon, a circle or an oval. The outer surface of the central portion 14 preferably reflects light incident thereon to make the fishing lure 10 more likely to attract the attention of a fish.

The central section 14 has a central bore 34 that has a common longitudinal centerline with the bore 18 that is formed in the base 12. The central bore 34 preferably has a larger diameter than the bore 18 in the base 14.

The front section 16 of the jet head fishing lure 10 of FIGS. 1, 3 and 4 tapers from a wider rear end 40 to a narrower front end 42. The front section 16 is shown to be generally frustoconical in shape and having a curved side portion 44 that connects to the front end 42. However, the front end 42 is at an angle $\theta$ with respect to the longitudinal center line of the fishing lure 10. The exact value of the angle $\theta$ is not critical to the invention, but it is preferably 30° to 60°. The end face 42 is also shown in FIGS. 3 and 4 to be concave with respect to a center line of the end face 42 that is at an angle $\theta$ to the center line of the fishing lure 10.

The front section 16 includes a cavity 50 that preferably has a generally frustoconical configuration. The cavity 50 has a common longitudinal center line with the base 14 and the central section 16. A central passage 52 extends from the front end face 42 into the cavity 50. The central passage 52 preferably is in longitudinal alignment with the cavity 50. The front section 16 includes a plurality of peripheral water intake passages 54A, 54B, etc. that extend from its outer surface 44 to the cavity 50. The peripheral water intake passages 54A, 54B etc. preferably are formed to be generally cylindrical with longitudinal axes that make an angle $\phi$ of about 40° to 45° relative to the longitudinal axis of the cavity 50.

When the fishing lure 10 is in use, a fishing line (not shown) passes through the central passage 52 and is attached to one or more hooks (not shown) that will in general be inside the skirt. It is intended that the fishing lure 10 will be pulled through the water. The angled front end face interacts with the water to cause the fishing lure 10 to make an erratic wiggling motion when it is pulled through the water.

Pulling the fishing lure 10 through the water also causes water to pass through the water intake passages 54A, 54B, etc. into the cavity 50. The water then is forced through the bores 34 and 18 in the central section and the base 14, respectively. The number of water intake passages 54A, 54B, etc., the number of such passages, the diameter of the passage 50, the diameter of the bore 34 and the diameter of the bore 18, are preferably selected such that a considerable amount of water will be forcibly ejected from the rear end of the fishing lure 10. Having the diameter of the bore 18 less than that of the bore 34 produces a nozzle effect when water is expelled from the base 14. The water ejected from the fishing lure head 10 causes movement of the skirt and produces bubbles that emanate from the skirt. The combination of the movement of the fishing lure head 10 and the bubbles coming out of the skirt are similar to the behavior of a small to medium-sized fish in water. Therefore, a large fish, such as a marlin, will be attracted the fishing lure and will often ingest it and become caught on the hook.

Figure 6:
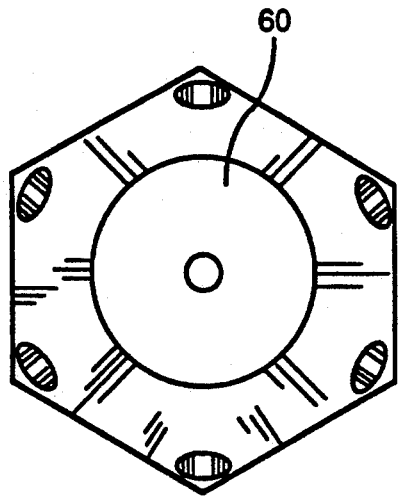
FIG. 6 is a front end elevation view showing a flat front end that may be formed on the jet head fishing lure of FIG. 5.

Referring to FIGS. 5 and 6, the fishing lure head 10 may have a flat front end surface 60. The flat front end surface 60 may be perpendicular to the longitudinal axis of the cavity 50 as illustrated. The end surface 60 may also be at any other desired angle to the longitudinal axis of the cavity 50.

Figure 7:
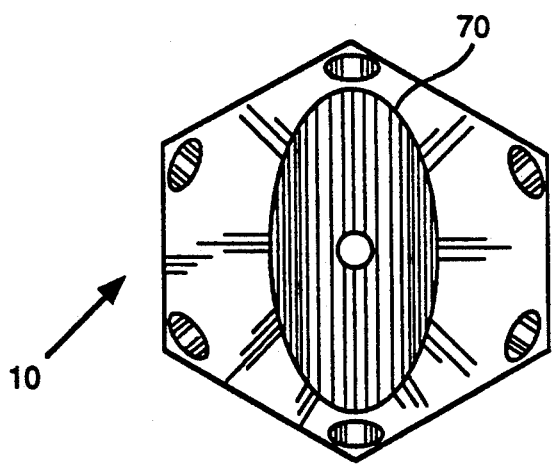
FIG. 7 is a front end elevation view showing a concave front end that may be formed on the jet head fishing lure of FIG. 5.

Referring to FIG. 7, the fishing lure head 10 may have a front end surface 70 that is formed in a concave dish-like configuration with a longitudinal axis that is coincident with that of the cavity 50. The cross section of the front end surface 70 may be either generally circular or elliptical.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A jet head fishing lure, comprising:

a housing having a base, the base including therein a first bore having a first diameter;

a central section connected to the base, the central section including therein a second bore having a second diameter, the first and second bores being in fluid communication; and a front section connected to the central section, the front section having an outer configuration that is generally frustoconical with a curved side surface and front end surface, the front section enclosing a generally frustoconical cavity, the front section further including a plurality of water intake passages through the curved side surface to conduct water into the frustoconical cavity, such that when the housing is towed through water, the water intake passages, the cavity in the front section, the bore in the central section and the bore in the base cooperate to eject a stream of water from the base.

2. The jet head fishing lure of claim 1 wherein the front end surface is formed to have a generally concave configuration.

3. The jet head fishing lure of claim 2 wherein the front end surface has a longitudinal center line that makes an acute angle with a longitudinal axis of the housing.

4. The jet head fishing lure of claim 2 wherein the front end surface makes an acute angle with a longitudinal axis of the housing.

5. The jet head fishing lure of claim 1 wherein the front end surface is formed to have a generally planar configuration.

6. The jet head fishing lure of claim 1 wherein the second diameter being larger than the first diameter to form a nozzle effect when water is expelled from the base.

7. The jet head fishing lure of claim 6 wherein the front end surface is formed to have a generally concave configuration.

8. The jet head fishing lure of claim 7 wherein the front end surface has a longitudinal center line that makes an acute angle with a longitudinal axis of the housing.

9. The jet head fishing lure of claim 7 wherein the front end surface makes an acute angle with a longitudinal axis of the housing.

10. The jet head fishing lure of claim 6 wherein the front end surface is formed to have a generally planar configuration.

* * * * *